United States Patent [19]

Eisenberg et al.

[11] Patent Number: 4,912,706
[45] Date of Patent: Mar. 27, 1990

[54] FRAME SYNCHRONIZATION IN A NETWORK OF TIME MULTIPLEXED OPTICAL SPACE SWITCHES

[75] Inventors: Martin Eisenberg, Holmdel; Jack M. Holtzman, Livingston; Nader Mehravari, Freehold Township, Monmouth County, all of N.J.

[73] Assignees: American Telephone and Telegraph Company, New York, N.Y.; AT&T Bell Laboratories, Murray Hill, N.J.

[21] Appl. No.: 275,802

[22] Filed: Nov. 18, 1988

[51] Int. Cl.[4] .............................................. H04J 3/06
[52] U.S. Cl. ..................................... 370/105.1; 370/1; 370/103; 375/109
[58] Field of Search ........................ 370/1, 4, 100, 103, 370/104, 63, 85, 67; 375/109; 455/600, 601, 612; 340/825.81, 825.82

[56] References Cited

U.S. PATENT DOCUMENTS

| 4,596,025 | 6/1986 | Satoh | 370/85 |
|---|---|---|---|
| 4,694,453 | 9/1987 | Kobayashi et al. | 370/85 |
| 4,701,907 | 10/1987 | Collins | 370/63 |
| 4,720,827 | 1/1988 | Kanaji | 370/4 |
| 4,731,878 | 3/1988 | Vaidya | 455/600 |
| 4,736,393 | 4/1988 | Grimes et al. | 370/103 |
| 4,736,462 | 4/1988 | Joel Jr. | 455/601 |
| 4,764,980 | 8/1988 | Sakaguchi et al. | 455/600 |
| 4,773,065 | 9/1988 | Kobayashi et al. | 370/67 |
| 4,797,589 | 1/1989 | Collins | 370/63 |
| 4,829,511 | 5/1989 | Georgiou | 370/1 |

FOREIGN PATENT DOCUMENTS 0125725 6/1987 Japan .................................. 455/600

OTHER PUBLICATIONS

*ICC*, Feb. 1987, "Applications of the Photonic Switching Technology", H. S. Hinton, pp. 1559-1564.
*IEEE Comm.*, vol. 25, No. 5, May 1987, "Photonic Switching Using Directional Couplers", H. S. Hinton, pp. 16-26.
*IEEE Comm.*, vol. 25, No. 5, May 1987, "Architectures for Guided-Wave Optical Space Switching Systems", R. A. Spanke, pp. 42-48.
*IEEE Jnl. Sel. Areas in Comm.*, vol. 6, No. 7, Aug. 1988, "Nonblocking Photonic Switch Networks", C. J. Smyth, pp. 1052-1062.
*IEEE Jnl. Sel. Areas in Comm.*, vol. 6, No. 7, Aug. 1988, "Waveguide Electrooptic Switch Arrays", R. C. Alferness, pp. 1117-1130.
*IEEE Jnl. Sel. Areas in Comm.*, vol. 6, No. 7, Aug. 1988, "Architectural Considerations for Photonic Switching Networks", H. S. Hinton, pp. 1209-1226.

*Primary Examiner*—Douglas W. Olms
*Assistant Examiner*—Alpus H. Hsu
*Attorney, Agent, or Firm*—Richard B. Havill

[57] ABSTRACT

In an optical switching network, a master optical space switch is interconnected with remote slave equipment for switching block-multiplexed messages among the remote equipment. The master optical space switch responds to a frequency reference clock and steps through a sequence of states, or configurations, for establishing various routes among the remote equipment for appropriately routing the messages to correct destinations. The frequency reference clock also is distributed to the remote equipment. During one of the states per frame, each remote slave equipment transmits a distinct signature signal. All of the slave equipments are connected through the master optical space switch to return to themselves their own signals transmitted during that time slot. Each remote slave equipment compares the returned signal with the originally transmitted signature signal to determine how much the round trip delay has varied from a nominal value. Phase of a local control clock signal in the slave equipment is adjusted to counteract the variation of the round trip delay. Thus the operation of the slave equipment is adjusted into synchronization with the master optical space switch so that messages transmitted from the slave equipment arrive at the master optical space switch at the appropriate time with respect to the periodic reconfigurations of the master optical space switch.

8 Claims, 4 Drawing Sheets

FRAME SYNCHRONIZATION IN A NETWORK OF TIME MULTIPLEXED OPTICAL SPACE SWITCHES

This invention relates to a network of time multiplexed optical space switches and more particularly to synchronizing frames of data in such a network.

BACKGROUND OF THE INVENTION

Optical transmission systems are increasingly used in telecommunication networks. They provide a relatively low cost, wideband transmission medium which supports many communication paths over each optical fiber. Voice, data and video signals are transmitted through the fibers as optical digital signals to minimize noise and distortion over long distances.

Because of the increased use of lightwave technology in transmission systems, there is interest also in using optical technology in switching systems for interconnecting a network of optical transmission systems. One advantage in using optical switching is the potential for eliminating the electrical-to-optical and optical-to-electrical conversions which are now required between the optical transmission systems and the existing electrical switching systems.

Frequency and frame synchronization are very important factors in an optical switching network. Very high bit rate bit streams from a variety of transmission systems must be coordinated for coincidental switching through the optical switches. Each sequential stream of information bits is grouped into a framed format. Within each frame, the bits are grouped according to their destination. Such groups of bits are called data segments. Following each data segment is a gap referred to as a guard band, or switch reconfiguration time. The purpose of the guard band is to provide time for reconfiguring the switch while allowing for time misalignment of frames arriving from different transmission system inputs to the switch. This type of multiplexing is known as block multiplexing.

Having grouped the information bits within each frame into data segments according to destination, it is possible to route the bits to their destination by properly configuring closed crosspoints in the optical switch during the guard bands. Switch reconfiguration must occur while the guard bands concur for all data streams arriving at the optical switch. Otherwise the switch reconfiguration occurs while one or more data segments are arriving at the switch and some data will be lost.

An optical switch may be of a variety of types; however, an optical space switch, based on titanium-diffused lithium niobate (Ti:Li Nb $O_3$) directional couplers, is a reasonable option for early optical switching systems. The directional couplers can be arranged in a crossbar format. In non-blocking optical switches, the state of each directional coupler is subject to change periodically several times per frame of information. The states of the directional couplers are changed so that every input can be connected to every output at least once during every frame.

There are problems associated with the design of a synchronization arrangement for an optical switch. First of all it is essential that the frames of data arriving at every optical switch are all synchronized with each other and with the switch itself. They must be synchronized in both frequency and in phase. Any synchronization arrangement can use no more than a reasonable amount of equipment at a reasonable cost. Secondly it is important to design the synchronization arrangement for minimal operating cost. Because there are guard bands between the data segments in the signal stream, there is a potential for inefficient operation since operating efficiency is defined as the quantity frame duration time less total overhead time in one frame divided by total frame duration time.

Typical designs for optical switching networks cover large geographic areas and include optical transmission systems that are several hundred to several thousand miles long. The interconnecting cables which include the optical transmission media are subjected to wide differences of environmental conditions and temperatures. As a result, the total duration of guard bands per frame tends to be very long in relation to the length of the frames. Since efficiency of operating the network is determined by dividing the quantity frame duration time less the total duration of the guard bands and other overhead time per frame by the frame duration time, long guard bands tend to make the network inefficient and relatively more expensive to operate. Such inefficiency presents a problem for designers of optical switching networks.

SUMMARY OF THE INVENTION

This problem and others are solved by an optical switching network including a master optical switch that is interconnected with remote slave equipments for switching block-multiplexed messages among the remote equipments. The master optical switch responds to a frequency reference clock and steps periodically through a sequence of states for establishing various routes, i.e., the switch connections are reconfigured periodically for establishing different connections between its inputs and outputs, among the remote equipments for appropriately routing the messages to correct destinations. The frequency reference clock is distributed from a common source to the master optical switch and to the remote slave equipments. During one of such states per frame, each remote slave equipment transmits a distinct signature signal. All of the slave equipments are connected through the master optical switch to return to themselves their own signals transmitted during that time slot. Each remote slave equipment compares the returned signal with the originally transmitted signature signal to determine how much round trip delay has varied from a nominal value and then adjusts the phase of a control clock signal to counteract the variation of the delay. Thus the time of operation of the remote slave equipment is adjusted and synchronized with the master optical switch so that messages transmitted from the remote equipment arrive at the master optical switch at the correct time with respect to the periodic reconfigurations of the master optical switch. Since the messages from the various remote slave equipments are synchronized to arrive at the master optical at the correct reconfiguration times, the required guard bands and total overhead time per frame are reduced to a very short time. Efficiency of the network is thereby increased substantially.

In a network of optical switches for routing block-multiplexed messages, one optical switch is designated a master and the other optical switches are slaves. A slave switch can in turn act as a master of other lower-level slave switches, so that control of the network is exercised in a hierarchical fashion. All of the switches are reconfigured periodically for routing different inputs to outputs. The phase of the control clock signal for each slave optical switch is adjusted so that its transmitted data messages arrive at the master optical switch at the correct times with respect to the periodic reconfigurations of the master optical switch. Variable lumped optical delay units are placed in the fibers which are used for transmitting from the master optical switch to the slave optical switches. These lumped optical delay units are controlled so that optical signal messages, transmitted from the master optical switch, arrive at each of the slave optical switches at the correct times with respect to the periodic reconfigurations of the slave optical switches. As a result, the network of optical switches is synchronized so that the required guard bands and total overhead time per frame are reduced and efficiency increased accordingly.

BRIEF DESCRIPTION OF THE DRAWING

The invention will be better understood by reading the following detailed description reference to the drawing wherein.

DETAILED DESCRIPTION

An optical space switch in a crossbar format receives inputs of time-multiplexed photonic signals. The input photonic signals are in a block-multiplexed format. In a block-multiplexed format, bits are grouped in blocks according to their destinations. The optical, or photonic, switch uses such a block-multiplexed format because the selected routes through the switch must be reconfigured for every change of destination. Thus the switch is reconfigured periodically for rearranging the routing of blocks of data arriving at the switch. Switch reconfigurations at the block rate are much less frequent than reconfigurations at the bit rate and can be accomplished with present technology.

Figure 1:
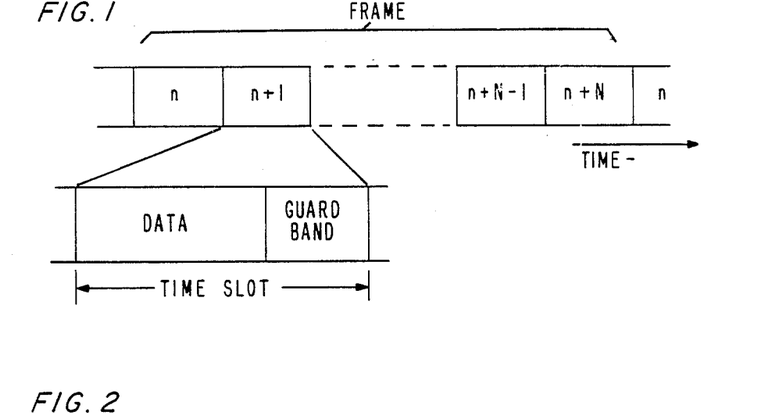
FIG. 1 is an illustrative timing diagram of a sequence of bits in a frame format including N+1 time slots per frame.

Referring now to FIG. 1, there is shown an example of a sequence of blocks of sequential data on a time line. The blocks are arranged in a frame wherein a first block n is followed by a block n+1, and so on until a block n+N, the last block of the frame. Then the designations of the blocks repeat in a subsequent frame, not shown.

Each block of data is included in a time slot. The time slot is long enough to include both a block of data and a guard band. The guard band is included in each time slot to compensate for any misalignment of the frames of data which are transmitted from different sources. Frames of data received by a switch from different end terminals generally are not fully aligned, i.e., the first bit of data in the frame from one end terminal does not arrive at the switch at the same time as the first bit of data in the frames of all other end terminals.

A frame synchronization problem is caused by those differences in the phases of signals arriving at the switch from the different sources. These differences in phase are a result of the variations in the time of transmission of photonic signals from end terminals, the ambient changes along cable routes and the changes in transmitter laser frequencies. Guard bands in the block format must be long enough to accommodate the maximum expected phase variations from all of those factors. As previously mentioned, the instants of switch reconfigurations must occur within the guard band of every input bit stream or else data is lost. Heretofore to accommodate the largest expected phase variations, the guard bands have been so long that they occupy something in the order of one thousand bits per time slot. That is excessive operating overhead for any network of commercial significance. Operating such a system is just too inefficient and costly.

Figure 2:
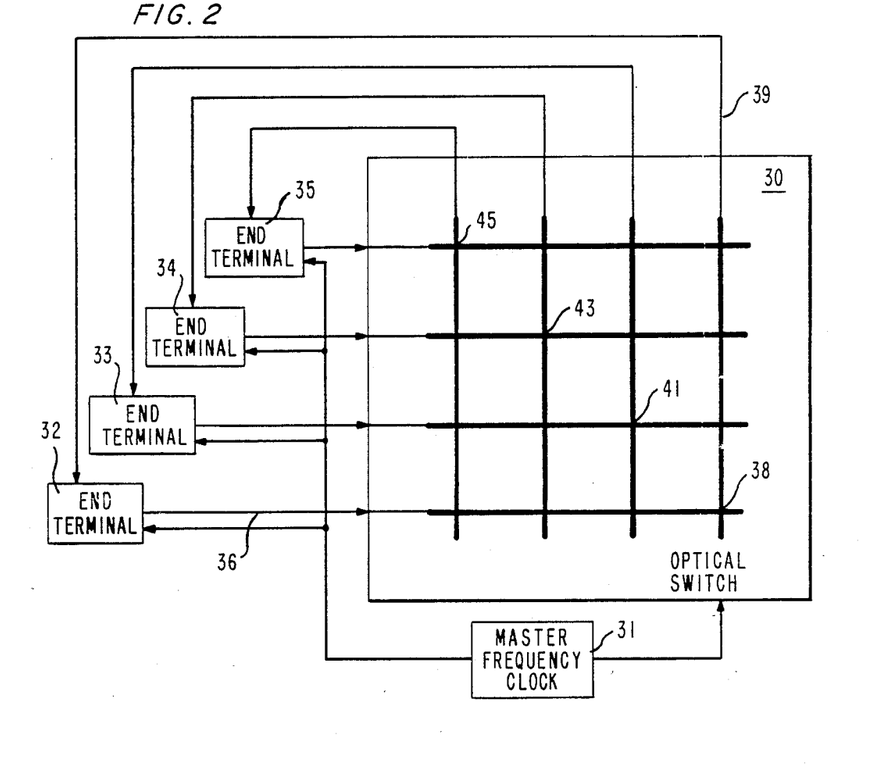
FIG. 2 is a schematic diagram of a four-by-four switch interconnected with four remote terminals.

Referring now to FIG. 2, there is shown a block diagram of an optical space switch 30, arranged in the form of a crossbar matrix switch, which is interconnected with four end terminals 32, 33, 34 and 35. Crosspoints in the matrix are based upon known photonic directional couplers, such as the previously mentioned titanium-diffused lithium niobate directional couplers.

During operation of the optical switch 30, control circuitry (not shown) periodically reconfigures the paths through the switch in response to control signals with reference to a master frequency clock 31. Each time the paths through the switch 30 are reconfigured, each end terminal 32, 33, 34 and 35 is connected through the switch to one of the end terminals. Thus signals arriving at any one input of the switch 30 can be routed to a different output and end terminal every time the switch is reconfigured.

Figure 3:
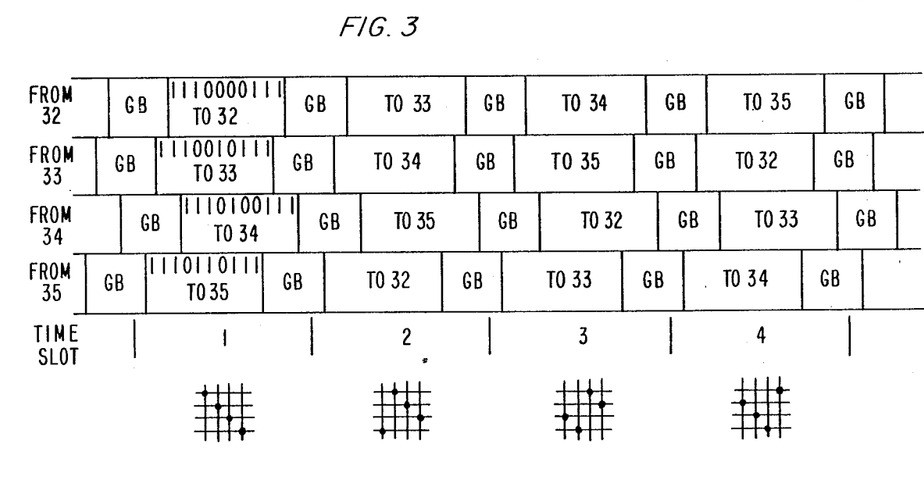
FIG. 3 is a timing diagram for switch reconfigurations of the four-by-four switch of FIG. 2.

Referring now to FIG. 3, there is shown a diagram presenting variations of time slot times of arrival received at the switch 30 of FIG. 2 from the end terminals 32, 33, 34 and 35. Each line across the diagram represents a sequence of data originating from one terminal. Four time slots are shown from left to right. They are represented by vertical divisions, which are numbered 1 through 4 across the button of the figure. Crosspoint connections, which exist during each time slot, are indicated by dots on the small matrix located directly below the associated time slot. Signals from any given end terminal are transferred through the switch 30 to a specific output according to the switch path configuration represented in the matrix for each time slot. An exemplary signature signal is shown in the line for each transmitting end terminal. Guard bands GB also are shown along the line for each transmitting end terminal.

In the switch configuration of the leftmost time slot, the crosspoints are closed along the diagonal from the upper left to the lower right. At such a time, the signals, transmitted in the FIG. 2 by the end terminal 32 through a fiber 36 to the switch 30, are routed through a closed crosspoint 38, are carried through another fiber 39, and are fed back to the receiving port of the end terminal 32. Likewise concurrent transmissions from the end terminals 33, 34 and 35 are routed respectively through closed crosspoints 41, 43 and 45 and are fed back to their own receiving ports.

This just-described switch configuration generally is not used in the ordinary sequence of operations by the switch 30 because each terminal has its output fed back to its own input port. Operation in this configuration is referred to hereinafter as feedback operation. By transmitting special signature signals from each end terminal 32, 33, 34, and 35 during such switch configuration and analyzing the returned signature signals within receiving circuitry in each end terminal, the round trip delay (from the end terminal through the switch 30 and back) can be determined for each end terminal. Any variation of such delay also can be determined so that compensating changes of phase can be made in local clock signals used for controlling each of the end terminals.

In FIG. 3, the reconfiguration patterns shown during the time slots 2, 3 and 4 allow for full inter-connectivity among all of the end terminals. Depending upon traffic needs, one or more of the switch configurations can be repeated during every frame of bits.

Figure 4:
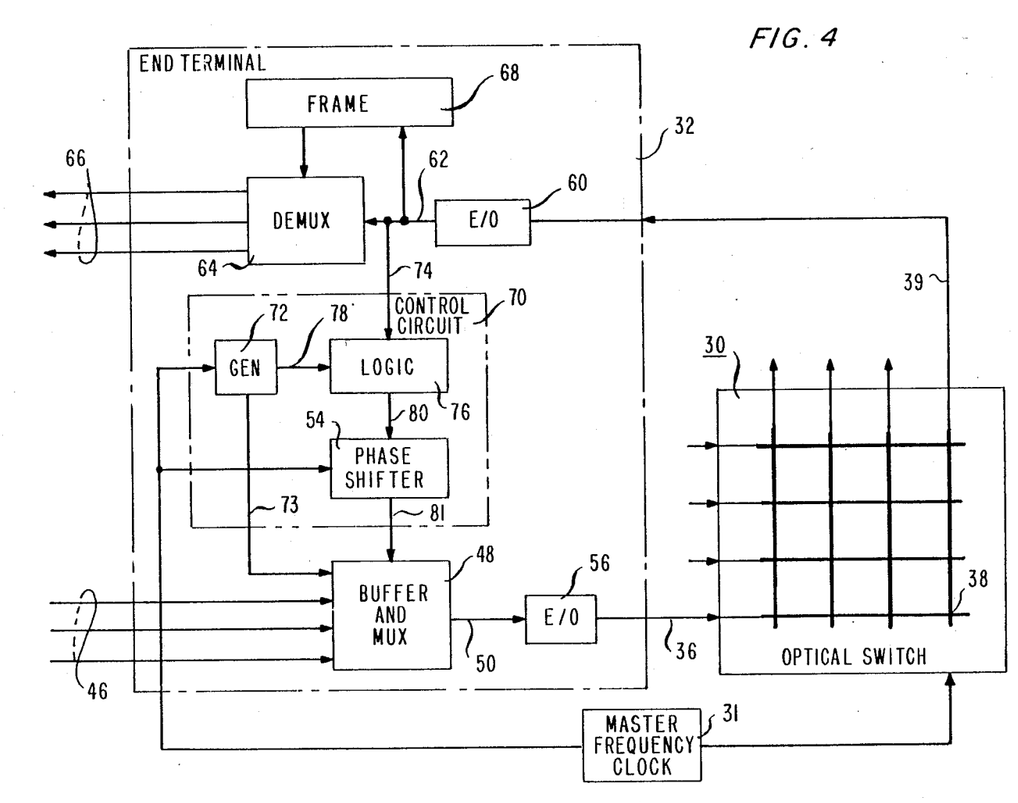
FIG. 4 is a block diagram of a remote slave equipment interconnected with the four-by-four switch of FIG. 2.

Referring now to FIG. 4, the end terminal 32 is shown as a more detailed block diagram interconnected by way of the optical fibers 36 and 39 with the optical space switch 30. In the end terminal 32, a group of input leads 46 apply electrical bit streams to the inputs of a buffer and multiplexer 48. Those input electrical bit streams together with a bit stream on lead 73 are combined into a single block multiplexed electrical bit stream on a lead 50 under timing control from signals applied from a phase shifter circuit 54. The bit stream on the lead 50 is applied to an electricalto-optical converter 56 and is converted into a representative optical bit stream on the optical fiber 36.

In the switch 30, the crosspoints are configured during the first time-slot so that the crosspoint 38 is closed to route the bit stream from the optical fiber 36 to the optical fiber 39 and on to the receiving port of the end terminal 32. There the optical bit stream is converted by an opticalto-electrical converter 60 into an electrical bit stream on a lead 62. That electrical bit stream is applied to a demultiplexer 64 which splits the bit stream into blocks which are directed to appropriate destinations located along lines 66.

A framing and control circuit 68 provides a source of timing signals, derived from the received bit stream, for controlling the timing of the demultiplexer 64.

A control circuit 70 adjusts the timing of the master clock signals from the master frequency clock 31 in dependence upon the duration of round trip delay as determined by the process of sending the special optical signature signal bit stream through the fiber 36, the switch 30 and the fiber 39 back to the terminal 32, as the returned signature signal. A specific signature signal representing the end terminal 32 is generated by a generator circuit 72 and is applied by way of the lead 73 to the input of the buffer and multiplexer 48. The signature signal bit stream includes a prefix string of "1's" followed by a distinctive bit pattern identifying the end terminal 32 and a suffix string of "1's". When that signature bit stream is fed back to the input port of the terminal 32, the electrical bit stream is carried through a lead 74 to a logic circuit 76. In the logic circuit 76, the returned bit stream is compared with a replica of the transmitted signature signal bit stream on a lead 78 for determining how much the returned bit stream varies in phase from its appropriate timing. The logic circuit 76 looks at a sample of the returned bit stream during the time that the signature signal bit stream is expected to return. Logic circuit 76 determines whether or not the signature signal for the terminal 32 is returned during the appropriate time slot. It might be shifted either ahead of or behind the appropriate time. If the signature signal for the terminal 32 is not returned during the appropriate time slot, the phase of the local control clock produced on the lead 81 by the phase shifter circuit 54 is adjusted with respect to the master clock frequency reference from the master frequency clock 31. This process is repeated until the signature signal bit stream for the terminal 32 is returned to the end terminal 32 during the appropriate time slot.

When the correct signature signal bit stream is received during the appropriate time slot, the logic circuit 76 looks for all of the prefix and suffix "1" bits. If all of those bits are returned during the appropriate time slot, no further adjustment is made to the phase of the local control clock produced by the phase shifter circuit 54. The slave end terminal 32 thus is synchronized with the master optical switch 30. If less than all of the prefix bits are returned, the phase of the local control clock on the lead 81 is delayed under control of a signal on the lead 80. If less than all of the suffix bits are returned, the phase of the local control clock on the lead 81 is advanced by the signal on the lead 80. In either case, the phase of the local control clock is adjusted to counteract the variation in delay which has occurred along the optical paths 36 and 39 and at other places between the end terminal 32 and the optical switch 30.

Logic circuit 76 produces on the lead 80 a signal representing the magnitude and the polarity of adjustment that the phase shifter circuit 54 must make in the local control clock signals derived from the master frequency clock 31. The circuit 76 alternately searches for the signature signal and adjusts the phase of the local control clock signal relative to the frequency reference, or master, clock 31 as applied through the signature signal generator 72 and the lead 78. Changing the phase of the local control clock signal on the lead 81 also changes the time at which the signature signal bit stream arrives at the optical switch 30. After appropriate adjustment of the phase of the local control clock on the lead 81, the signature signal arrives at the optical switch 30 in synchronism with the master frequency clock signal controlling the optical switch 30. The optical switch will be reconfigured during the guard band preceding the designated time slot for arrival of the signature signal. All of the signature signal, including prefix and suffix bits, is routed to the optical fiber 39 which carries the entire signature signal back to the receiving port of the end terminal 32. Since the entire signature signal is received, the frame of data transmitted from end terminal 32 is locked in synchronism with the master frequency clock controlling the switch 30.

Once the end terminals are locked with the master optical switch 30, each can detect subsequent loss of one or more bits from the prefix or the suffix of its signature signal and make minor adjustments to the phase of its local control clock signals for maintaining synchronization. Adjustment of the phase can occur during every frame of data. Such constant adjustment maintains synchronization with very close tolerance. The required guard bands therefore are shortened with respect to the lengthy duration which was required heretofore. Extra time required for transmitting the signature signals once during every frame is offset by a much more substantial reduction in the guard bands of every frame. Total overhead therefore is reduced substantially, and the network operates much more efficiently. Each of the end terminals 32, 33, 34 and 35 of FIG. 2 has an exclusive signature signal bit stream with prefix and suffix bits. These signature signals can be distinguished from each other and from customer data so that each end terminal can correctly identify its own signature signal and round trip delay. Thus each end terminal is capable of synchronizing transmitted frames of bits with the reconfiguration times of the optical switch 30. Once all of the end terminals are synchronized with the optical switch 30, all data in the network is routed and periodically rerouted through the optical switch 30 without losing or dropping any bits.

Figure 5:
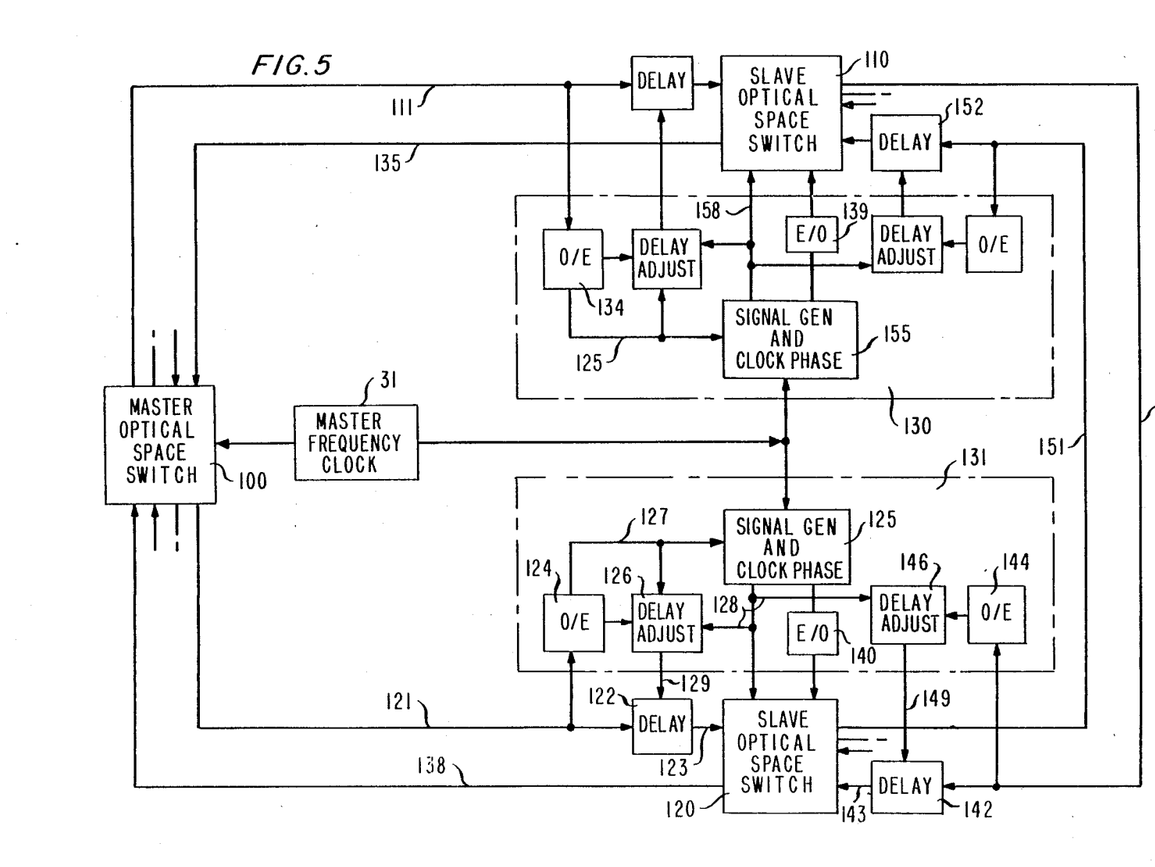
FIG. 5 is a block diagram of a network of optical switches and interconnecting optical fiber lines.

Referring now to FIG. 5, there is shown a network of optical, or photonic, space switches 100, 110 and 120. The switches are shown as 4x4 matrices, as in FIG. 2. All of the optical space switches 100, 110 and 120 of FIG. 5 can be interconnected with various end terminals, in accordance with the arrangement of FIG. 2. Also the optical switches 100, 110 and 120 are reconfigured periodically (every time slot) to route incoming bit streams of data to the various outputs. The optical switches provide full connectivity between inputs and outputs during every frame of data. This network presents one synchronization problem, which is solved by a process similar to the one just described with respect to FIGS. 2, 3, and 4, and other synchronization problems that are solved by other processes.

With respect to the one similar solution, the optical switch 100 acts as a master to both of the other optical switches 110 and 120. Master frequency clock 31 applies reference frequency clock signals to all three optical switch locations so that they operate in reference to a single reference frequency clock source. Once per frame of bits, a distinctive signature signal is generated by each of the circuits 155 and 125. Those electrical signature signals are converted to optical signature signals by electrical-to-optical converters 139 and 140, respectively. The optical signature signals are applied to the respective slave optical space switches 110 and 120 for routing through optical fibers 135 and 138 to the master optical space switch 100. By the configuration of the master optical switch 100, the optical signals are routed through the master optical switch and back to their source locations by way of optical fibers 111 and 121. These optical signals, fed back to the circuitries 130 and 131, are converted from optical signals to electrical signals by optical-to-electrical converters 134 and 124. By way of leads 125 and 127 the returned electrical signals are applied to the circuits 155 and 125 for comparison with the distinctive signature signals which were sent to the master optical switch 100. Any phase adjustment, required as a result of the comparison, is imparted to the control clock signals on the leads 158 and 128. These phase adjustments are made with reference to the reference frequency clock signal from the master frequency clock 31. In this operation, each of the circuitries 130 and 131 scans for the appropriate signature signal and adjusts the phase of its local control clock signal, as required, so that all customer data, transmitted from the slave optical space switches 110 and 120, arrive at the master optical switch 100 at the appropriate time with respect to every reconfiguration of the master optical switch 100.

Another synchronization problem is to assure that all customer data, sent from the master optical switch 100 to either of the slave optical space switches 110 or 120, arrive at the destination slave switch at the appropriate time for its reconfigurations. This problem is solved by adjusting delay in the paths through the fibers 111 and 121 carrying data from the master optical switch 100 to the slave optical switches 110 and 120, respectively.

Frames of optical data signals from the master optical switch 100 are transmitted through the optical fiber 121, a variable optical delay device 122, and a fiber 123 to the slave optical space switch 120. The frames of optical data signals from the fiber 121 also are applied to an optical-to-electrical converter unit 124. This converter unit 124 together with a signature signal generator and clock phase control circuit 125 are similar to part of the arrangement of FIG. 4. A delay adjustment circuit 126, responsive to the frames of received electrical signals by way of a lead 127, determines the starting times of the received frames of bits. The delay adjustment circuit 126 compares the timing of the received frames of bits with the framing of the local control clock signals on lead 128 and produces a signal on the lead 129 to adjust the delay of the variable optical delay device 122 so that frame times of optical signals arriving on the fiber 121, as applied through the fiber 123 to the switch 120, are appropriate for the reconfiguration timing of the slave optical space switch 120.

Slave optical switch 110 of FIG. 5 is synchronized with the master optical switch 100 in a manner similar to that just described with respect to the slave optical switch 120.

An additional synchronization problem is to assure that data, originating at either of the slave optical space switches 110 and 120 arrives at the other slave optical switch at a time appropriate for the reconfiguration timing of the receiving slave optical switch. Frames of optical data signals from the slave optical switch 110 are transmitted through an optical fiber 141 and are applied through a variable optical delay device 142 and a fiber 143 to the slave optical switch 120. Frames of optical data signals from the fiber 141 also are applied to an optical-to-electrical converter unit 144. A delay adjustment circuit 146, responsive to the electrical data signals from the converter unit 144, determines the starting times of frames. Frame timing is compared with the local control clock signal on the lead 128. Delay adjustment circuit 146 produces a control signal on the lead 149 to adjust the delay of the variable optical delay unit 142 so that the frame times of optical signals arriving on the fiber 141, as applied through the fiber 143 to the switch 120, are appropriate for the reconfiguration timing of the slave optical switch 120.

A variable optical delay device 152 is adjusted to synchronize optical data signals arriving at the slave optical switch 110 by way of the optical fiber 151 so that frames of those signals are timed appropriately with the reconfiguration timing of the slave optical switch 110. This function is accomplished in a manner similar to the process just described with respect to data sent from the slave optical switch 110 to the slave optical switch 120.

The foregoing describes an arrangement of an optical switching network that is synchronized throughout in frequency and in phase. Frequency synchronization is accomplished by distributing the master reference frequency clock to control all nodes in the network. Phase synchronization is accomplished in part by adjusting the phases of all local clock control signals with respect to variations in round trip delay experienced by the signature signals. Additional phase synchronization is accomplished by adjusting the delay in optical paths between nodes in response to the detected difference between the frame times of received frames and the frame times of the local clock control signal.

All of such synchronization substantially reduces the variations of frame timing among the different sources of data being received at each node. As a result the required duration of guard bands also are substantially reduced to the order of tens of bits. The overhead time required for the reduced guard bands plus the additional time for transmitting the signature signal during every frame of bits is much less than the overhead time required heretofore for the guard bands. Thus the total overhead time is reduced enabling the optical switch network to operate with very high efficiencies.

The foregoing describes one or more embodiments of applicants' advantageous optical switching network synchronization arrangement and method of operation. The embodiments and method described herein together with other embodiments and methods made obvious in view thereof are considered to be within the scope of the appended claims.

We claim:

1. A method for synchronizing a remote slave equipment with a master photonic switch comprising the steps of:
   producing at the remote slave equipment a control clock signal from a frequency reference clock;
   repeatedly transmitting from the remote slave equipment to the master photonic switch block multiplexed messages including a signature-sequence of bits during a predetermined time slot of every frame generated in response to the control clock signal;
   returning from the master photonic switch to the remote slave equipment a fed back portion of the signature-sequence of bits that reaches the master photonic switch during the predetermined time slot of every frame;
   the remote slave equipment comparing the fed back portion of the signature-sequence of bits with the signature-sequence of bits for determining a phase difference therebetween; and
   adjusting, in response to the phase difference, the phase of the control clock signal with respect to the frequency reference clock.

2. A method for synchronizing a remote slave equipment with a master photonic switch, in accordance with claim 1, wherein
   the signature-sequence of bits includes a predetermined number of prefix bits, a distinctive identification code for the remote slave equipment, and a predetermined number of suffix bits; and
   the phase difference is dependent upon feedback of the distinctive identification code and the fed back portion of the predetermined numbers of prefix and suffix bits.

3. A method for synchronizing a remote slave equipment with a master optical switch, in accordance with claim 2, wherein
   the remote slave equipment is a first slave optical switch; and
   the method comprising the further steps of:
   periodically reconfiguring the first slave optical switch in response to the control clock signal;
   at the first slave optical switch determining, with respect to the control clock signal, variations of timing of framing signals accompanying optical data signals transmitted from a second slave optical switch to the first slave optical switch; and
   adjusting delay, imparted to the optical data signals transmitted from the second slave optical switch to the first slave optical switch, in response to the variation of the timing of the accompanying framing signals so that the optical data signals arrive at the first slave optical switch at the correct time with respect to the periodic reconfigurations of the first slave optical switch.

4. A method for synchronizing a remote slave equipment with a master optical switch comprising the steps of:
   in response to a frequency reference clock signal, periodically reconfiguring the master optical switch for switching blockmultiplexed optical signals, received from the remote slave equipment, to predetermined destinations;
   at the remote slave equipment determining, with respect to the frequency reference clock signal, variations of round trip delay for optical data signals transmitted from the remote slave equipment through optical fibers and the master optical switch back to the remote slave equipment;
   adjusting phase of a control clock signal for the remote slave equipment to counteract the variations of the round trip delay for the optical data signals; and
   controlling operation of the remote slave equipment in response to the adjusted control clock signal so that blocks of optical signals transmitted from the remote slave equipment to the master optical switch arrive at the master optical switch at the correct time with respect to the periodic reconfigurations of the master optical switch.

5. A method for synchronizing a remote slave optical equipment with a master optical switch, in accordance with claim 4, wherein
   the remote slave equipment is a slave optical switch; and
   the method comprising the further steps of:
   in response to the control clock signal, periodically reconfiguring the slave optical switch for switching block-multiplexed optical signals received from the master optical switch to predetermined destinations.

6. A method for synchronizing a remote slave optical equipment with a master optical switch, in accordance with claim 5, comprising the further steps of:
   at the slave optical switch determining, with respect to the adjusted control clock signal, variations of timing of framing signals accompanying block-multiplexed optical signals received from the master optical switch at the slave optical switch; and
   adjusting delay, imparted to the block-multiplexed optical signals transmitted from the master optical switch to the slave optical switch, in response to the variation of the timing of the accompanying framing signals so that the block-multiplexed optical signals arrive at the slave optical switch at the correct time with respect to the periodic reconfigurations of the slave optical switch.

7. A method for synchronizing periodic reconfigurations of a slave optical switch with periodic reconfigurations of a master optical switch comprising the steps of:
   at the slave optical switch determining, with respect to a control clock signal, variations of timing of framing signals accompanying blocks of optical data signals routed through the master optical switch to the slave optical switch; and
   adjusting delay, imparted to the blocks of optical data signals between the master optical switch and the slave optical switch, in response to the variations of the timing of the framing signals so that the blocks of optical data signals arrive at the slave optical switch at the correct time with respect to the periodic reconfigurations of the slave optical switch.

8. A method for synchronizing a remote slave equipment with a master photonic switch comprising the steps of:
   producing a control clock signal at the remote slave equipment;
   periodically reconfiguring the master photonic switch;
   transmitting from the remote slave equipment to the master photonic switch a signature signal including a predetermined number of prefix bits, a distinctive identification code, and a predetermined number of suffix bits;
   feeding back from the master photonic switch to the remote slave equipment that portion of the signature signal that reaches the master photonic switch; and
   adjusting the phase of the control clock signal in dependence upon the portion of the signature signal.

* * * * *